United States Patent
Zaslavsky et al.

(10) Patent No.: US 6,620,272 B2
(45) Date of Patent: Sep. 16, 2003

(54) METHOD OF ASSEMBLING A CERAMIC BODY

(75) Inventors: Gregory Zaslavsky, Marblehead, MA (US); Christopher S. Nordahl, Beverly, MA (US); Joseph V. Lima, Salem, MA (US); Arlene Hecker, Beverly, MA (US)

(73) Assignee: Osram Sylvania Inc., Danvers, MA (US)

( * ) Notice: Subject to any disclaimer, the term of this patent is extended or adjusted under 35 U.S.C. 154(b) by 63 days.

(21) Appl. No.: 10/077,504

(22) Filed: Feb. 15, 2002

(65) Prior Publication Data

US 2002/0117249 A1 Aug. 29, 2002

Related U.S. Application Data

(60) Provisional application No. 60/271,174, filed on Feb. 23, 2001.

(51) Int. Cl.[7] .............................................. B29C 65/06
(52) U.S. Cl. ..................... 156/73.5; 156/82; 156/272.8; 156/292; 156/308.2
(58) Field of Search ................... 156/73.5, 73.6, 156/82, 89.11, 272.2, 272.8, 292, 308.2, 379.6, 379.9, 497, 580, 583.1

(56) References Cited

U.S. PATENT DOCUMENTS

| 5,239,230 A | * | 8/1993 | Mathews et al. | ............ 313/571 |
| 5,497,049 A | * | 3/1996 | Fischer | ........................ 313/634 |
| 5,936,351 A | | 8/1999 | Lang | .......................... 313/634 |

FOREIGN PATENT DOCUMENTS

| EP | 0 954 007 A1 | 11/1999 | ............. H01J/9/32 |
| EP | 0 971 043 A2 | 1/2000 | ........... C22C/29/12 |

* cited by examiner

Primary Examiner—James Sells
(74) Attorney, Agent, or Firm—Robert F. Clark

(57) ABSTRACT

A method for making a ceramic body is provided wherein the ceramic components are joined in their green state. The method includes applying heat to the surfaces to be joined to cause a localized melting of the binder. The surfaces are then brought together and joined by alternately applying compression and stretching. The method is particularly advantageous for forming unitary ceramic arc tube bodies for high intensity discharge (HID) lighting applications.

21 Claims, 5 Drawing Sheets

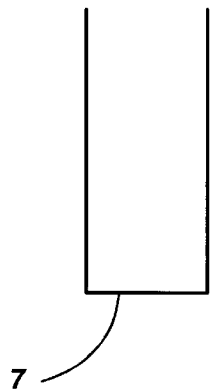
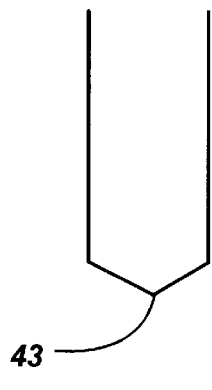
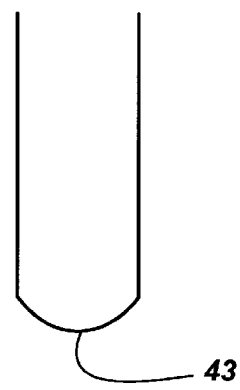
Fig. 9a  Fig. 9b  Fig. 9c
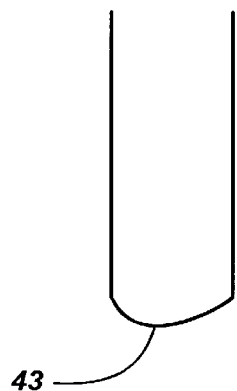
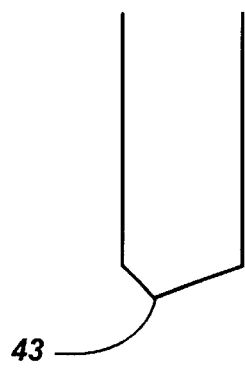
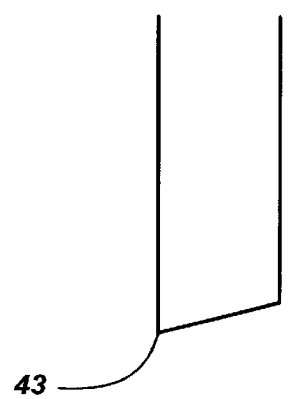
Fig. 9d  Fig. 9e  Fig. 9f

METHOD OF ASSEMBLING A CERAMIC BODY

CROSS REFERENCES TO RELATED APPLICATIONS

This application claims the benefit of U.S. Provisional Application No. 60/271,174, filed Feb. 23, 2001.

TECHNICAL FIELD

This application relates to methods of joining ceramic components in their green state. In particular, this application relates a method of thermally joining ceramic arc tube parts to form a unitary arc tube body for high intensity discharge (HID) lamps.

BACKGROUND OF THE INVENTION

In general, commercial ceramic arc tubes used in high intensity discharge (HID) lamps are comprised of a polycrystalline alumina ceramic which may contain one or more additives to control grain growth. As a first step, alumina powder is mixed with a binder material such as a wax or thermoplastic and then formed into the desired shape by isostatic pressing, extrusion, or injection molding. The binder materials help the molded alumina piece retain its shape while the piece is in its "green state," i.e., prior to binder removal and sintering. The binder is later removed the pieces are fired.

Since the arc tubes are fabricated from two or more pieces, it is necessary to form hermetic seals at the interfaces between the pieces which are capable of withstanding the high stresses, temperatures and corrosive chemicals present in an operating arc tube. The conventional method of assembling ceramic arc tube pieces involves several assembly and pre-sintering steps in which the pieces are aligned and sealed together by means of interference fits. The interference fits result from the differential shrinkage of the pieces during firing. In each of the assembly and pre-sintering steps, there exists an opportunity for misalignment or other errors to occur. Minimizing the number of firing cycles can improve the efficiency of the arc tube production process. Furthermore, the practice of using interference fits to form the hermetic seals requires high degree of control over dimensional tolerances and the shrinkage of the ceramic pieces during firing.

SUMMARY OF THE INVENTION

It is an object of the invention to obviate the disadvantages of the prior art.

It is another object of the invention to provide a method of assembling a ceramic body such as an arc tube which minimizes the number of firing and assembly steps.

It is further object of the invention to provide a method for forming hermetic seals in ceramic arc tubes which doesn't rely on interference fits.

In accordance with one object the invention, there is provided a method of assembling a ceramic body, the ceramic body containing a binder material and comprising at least a first section having a first joining surface and a second section having a second joining surface, the method comprising the steps of:

(a) simultaneously heating the first and second joining surfaces to cause localized melting of the binder material;

(b) initially contacting the first joining surface with the second joining surface to form an interface region; and (c) alternatively applying compression and stretching to the interface region to join the first section to the second section.

In accordance with another object of the invention, there is provided a method of assembling a ceramic arc tube in a green state comprising the steps of:

(a) securing a first axially symmetric arc tube section in a first holder, the first arc tube section having a first electrode-receiving member and a first cavity-forming member, the first cavity-forming member having a first annular joining surface;

(b) securing a second axially symmetric arc tube section in a second holder, the second arc tube section having a second electrode-receiving member and a second cavity-forming member, the second cavity-forming member having a second annular joining surface, the first and second arc tube sections containing a binder material;

(c) simultaneously heating the first and second annular joining surfaces to cause a localized melting of the binder material;

(d) initially contacting the first annular joining surface with the second annular joining surface to form an interface region; and (e) joining the first section to the second section by initially displacing at least one of the sections in a forward direction and then displacing at least one of the sections in a reverse direction.

BRIEF DESCRIPTION OF THE DRAWINGS

FIGS. 9a–f are cross-sectional illustrations of various joining surfaces.

DETAILED DESCRIPTION OF THE INVENTION

For a better understanding of the present invention, together with other and further objects, advantages and capabilities thereof, reference is made to the following disclosure and appended claims taken in conjunction with the above-described drawings.

The method of this invention thermally joins ceramic parts in their green state while the binder material is still present. Since the parts are joined in their green state, the method may be used with a wide variety of ceramic materials and in a number of applications. In a preferred application, the method is used to join green ceramic arc tube pieces to form a unitary arc tube for use in a high intensity discharge lamp. The method is capable of forming hermetic seals between the arc tube pieces without the misalignment and distortion problems associated with interference fits. The method is particularly advantageous for use with a symmetrical two-piece arc tube construction where the two pieces are joined at the center of the arc tube. By using two identical halves of an arc tube, the production tooling becomes simplified since only one geometrical part is required in contrast to three- and five-piece constructions which require two and three different geometrical parts, respectively.

Figures 1, 2:
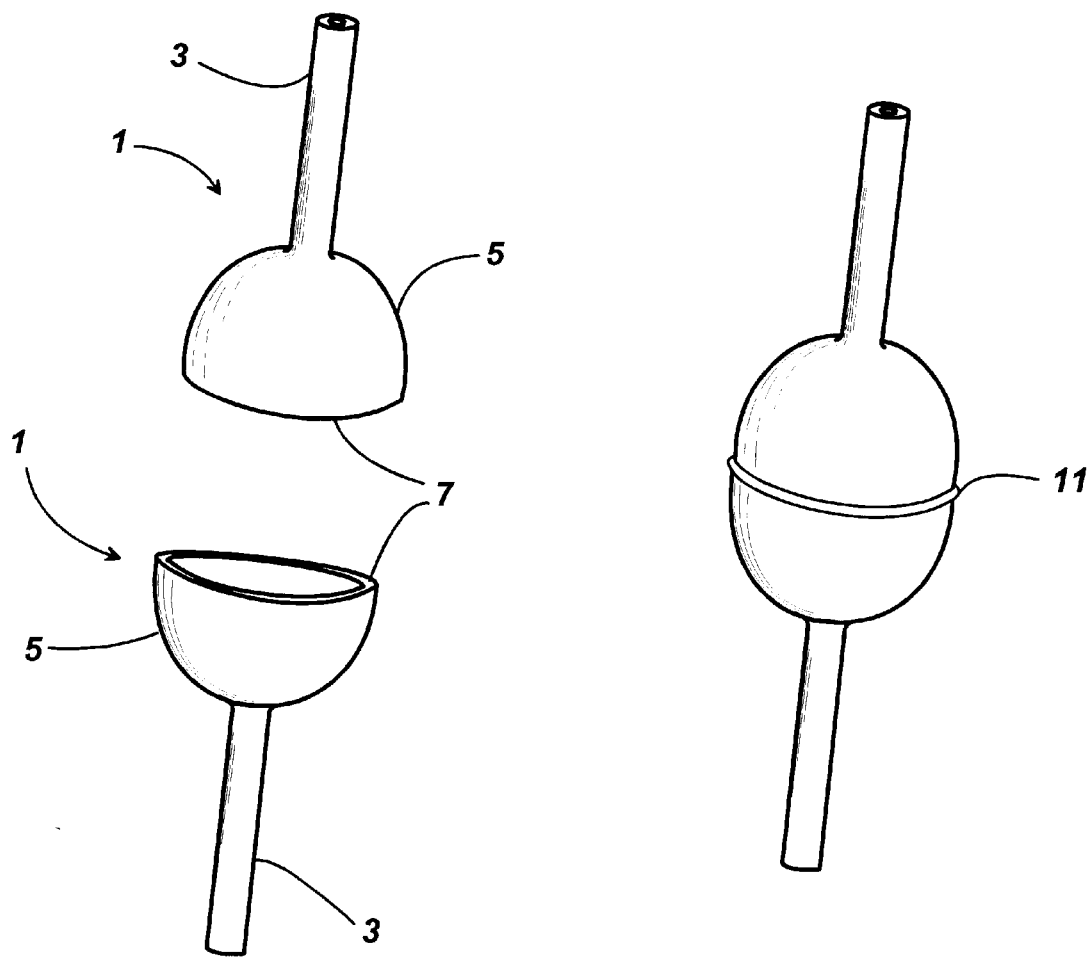
FIG. 1 is an illustration of the sections of an axially symmetric, two-piece ceramic arc tube.
FIG. 2 is an illustration of the ceramic arc tube of FIG. 1 after the two sections have been joined by the method of this invention.

A preferred two-piece ceramic arc tube assembly is shown in FIG. 1. Each arc tube section 1 is axially symmetric and has integrally formed electrode-receiving member 3 and cavity-forming member 5. The open end of each cavity-forming member has an annular joining surface 7. In this embodiment, a flat joining surface is shown, however, the joining surface also may be curved, beveled, or beaded. Various joining surfaces are illustrated in FIGS. 9a–f. The cross-sectional profiles of some symmetric joining surfaces are shown in FIGS. 9a–c. The flat joining surface is shown in FIG. 9a. The joining surfaces in FIGS. 9b and 9c have beveled and curved cross-sectional profiles, respectively, which give rise to contact ridge 43. FIGS. 9d–f illustrate the cross-sectional profiles of some asymmetric joining surfaces wherein contact ridge 43 is offset toward the center of the section to insure sealing on the inside of the arc tube.

During assembly, the binder material at the joining surfaces of the green ceramic sections is melted by simultaneously heating the joining surfaces. In order to preserve the integrity of the shape of the formed part, heat is applied just to the joining surfaces so that only a localized melting occurs. Preferably, the surfaces are heated by convection with a heated gas (e.g., forced hot air). Other methods of heating may include radiative heating by an infra-red laser, an incandescent lamp, or an incandescent resistive element. In order to improve heating uniformity, the sections may be rotated about their axis while heating. Once the binder material at the surface has melted, the sections are quickly mated by contacting the joining surfaces and alternately applying compression and stretching to the interface region. FIG. 2 shows the arc tube after the sections are thermally joined. This method of assembly produces a unitary arc tube body with visible cosmetic seam 11 in the interface region between the two sections. When the arc tube body is sintered, the resulting hermetic seal between the two sections is capable of withstanding the harsh environment of the operating arc tube. Although the seam remains visible after the arc tube is sintered, it has been shown to have little or no adverse impact on the performance of the finished arc tube.

Figure 3:
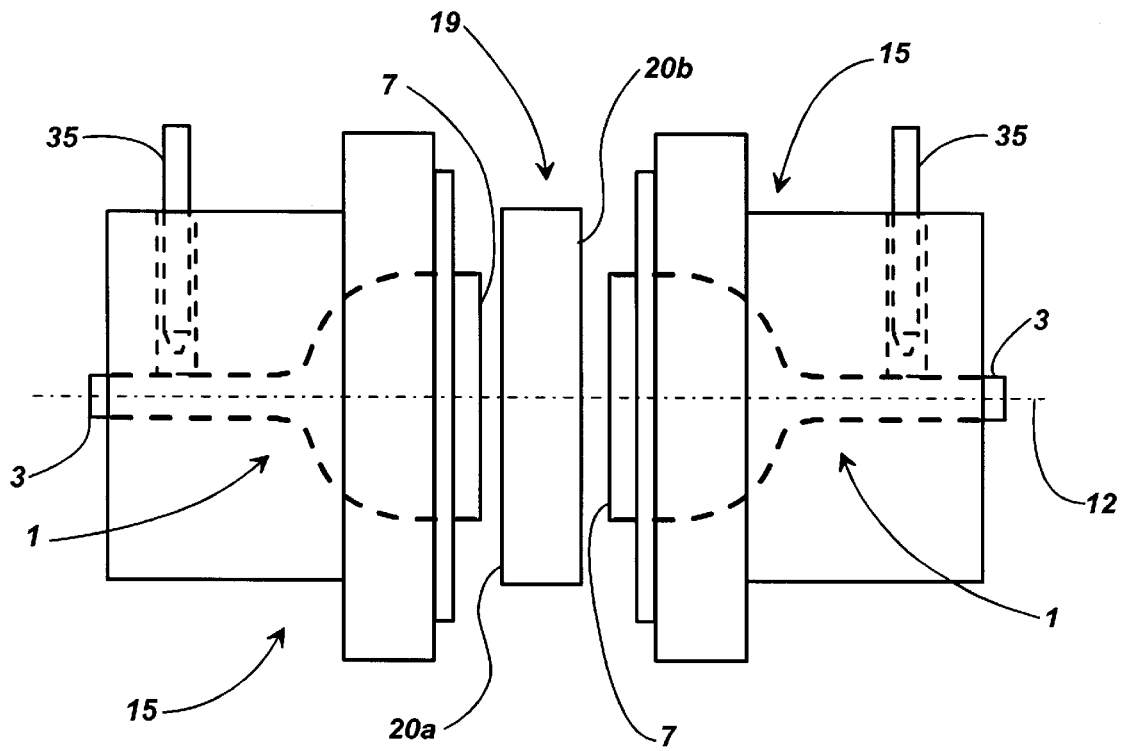
FIG. 3 is an illustration of the apparatus used to join the sections of the ceramic arc tube of FIG. 1.

In FIG. 3, the arc tube sections 1 are shown secured in the joining apparatus through the use of opposed holders 15. The arc tube sections and their corresponding holders are oriented to share common axis 12. Retractable pins 35 engage each the electrode-receiving member 3 of each arc tube section to hold the section in place during joining. Other means of securing the arc tube section may include the use of compression seal o-rings positioned inside the holder. Once secured in the apparatus, the relative positions of the two sections are registered so that they may be accurately mated. In a preferred method, the two arc tube sections are pushed against a retractable reference plate which is inserted between the sections prior to heating. Once the sections are appropriately positioned, retractable pins 35 engage the sections to maintain their relative positions and the reference plate is retracted.

Figure 4:
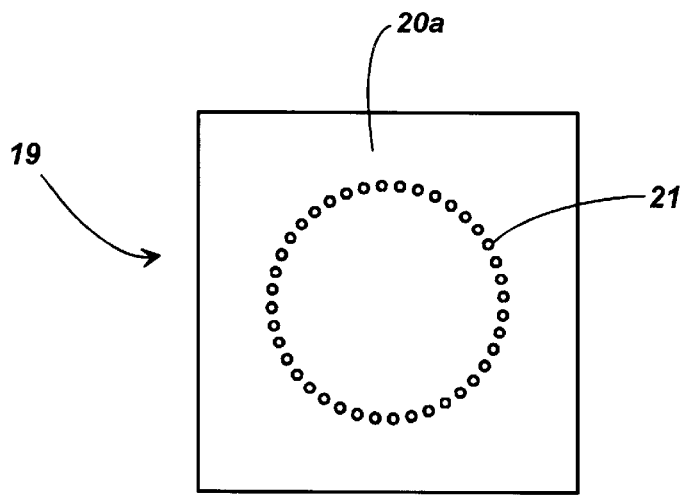
FIG. 4 is an illustration of the convection heater used to heat the joining surfaces of the ceramic arc tube sections.

Heater 19 is then interposed between the two holders and adjacent to the joining surfaces 7 of the arc tube sections. Heater 19 has faces 20a and 20b which emit jets of hot air in a pattern corresponding to the shape of the adjacent joining surface. A front view of heater 19 is shown in FIG. 4. Face 20a has pin holes 21 which are arranged in a circular pattern corresponding to the annular joining surface 7 of the arc tube sections. Hot air is forced into heater 19 from a source of heated air (not shown) in fluid communication with the heater. The jets of hot air emitted from the pin hole patterns on the opposite faces 20a, 20b of heater 19 cause the localized melting of the binder material at the joining surfaces. Heater 19 is removed once the binder material has become sufficiently softened and tacky. Too much heat can cause the ceramic parts to become overheated to the point where mechanical integrity is lost and excessive deformation of the parts occurs. The working range of heating temperatures and times which result in acceptable joining is determined empirically for each configuration and binder system. For this two-piece configuration, the heating time ranges from 4 to 10 seconds. Parts with larger cross sections require longer times to reach the same degree of plasticity and tackiness.

Figure 5:
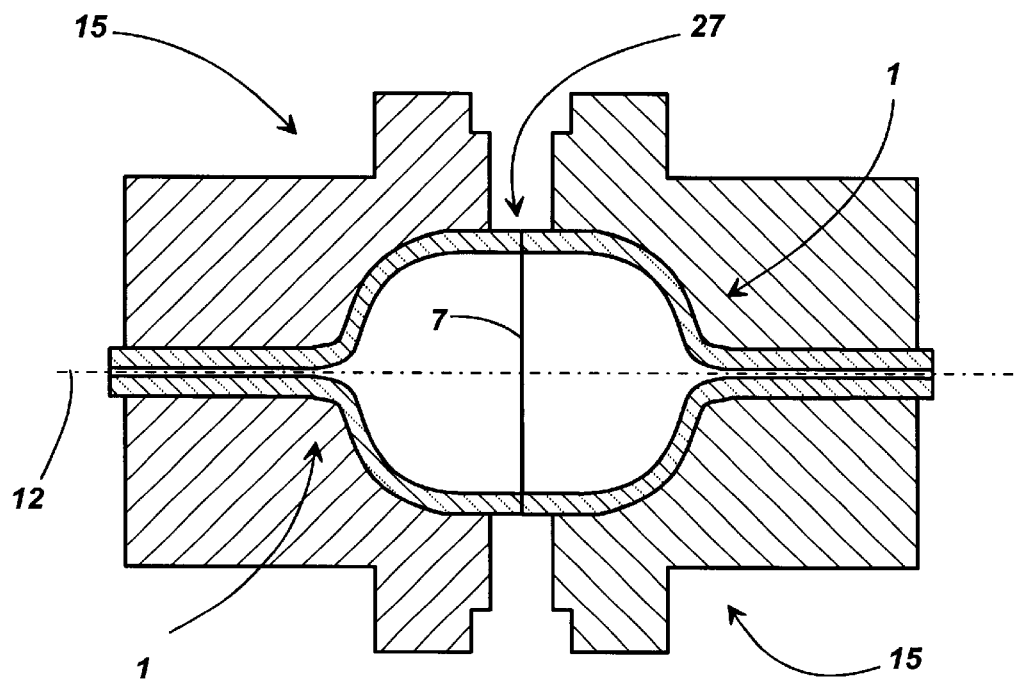
FIG. 5 is a cross-sectional illustration showing the two sections of the arc tube in contact after the binder material at the joining surfaces has been melted.
Figure 6:
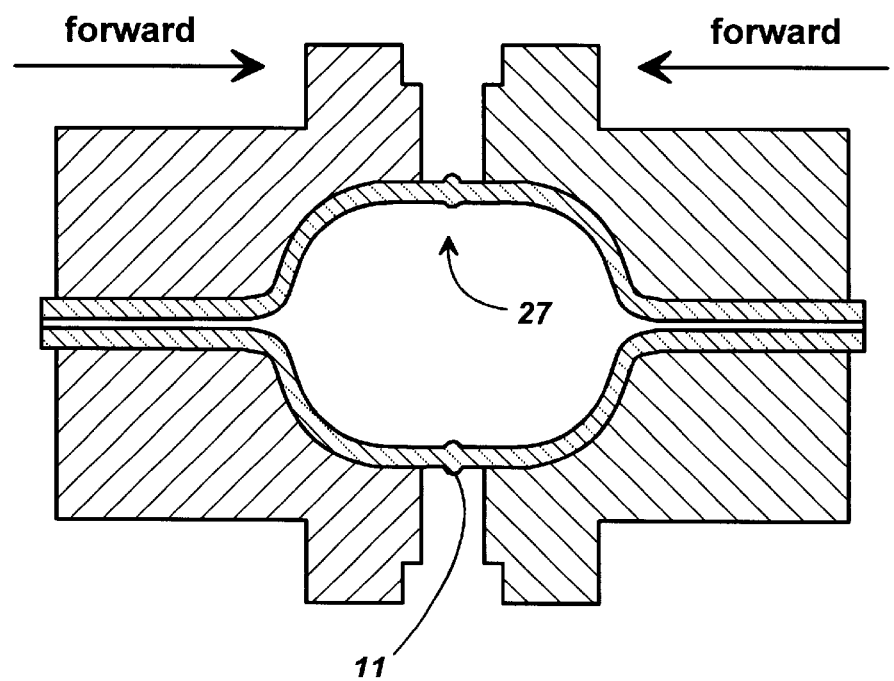
FIG. 6 is a cross-sectional illustration showing the further forward displacement of the sections after the joining surfaces have been contacted.
Figure 7:
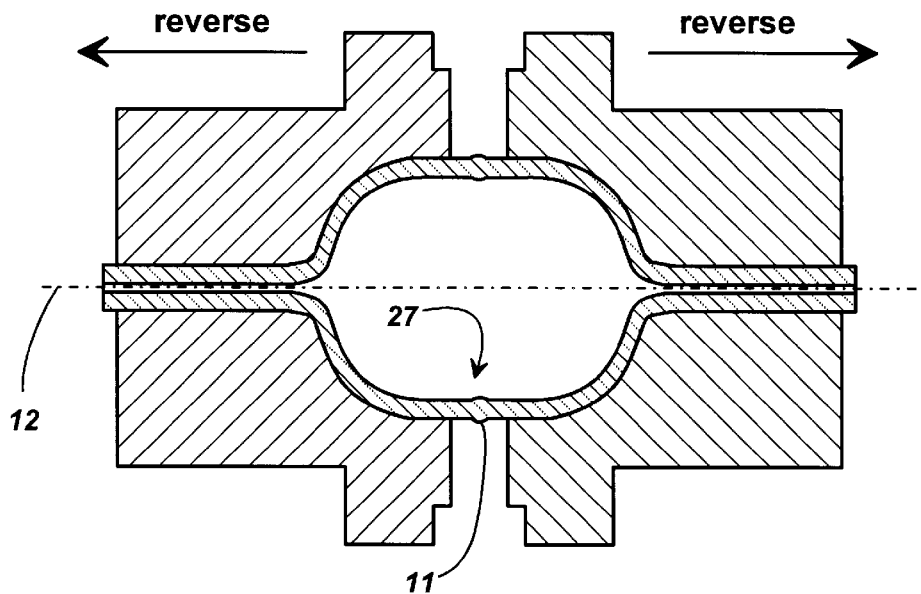
FIG. 7 is a cross-sectional illustration showing a reverse displacement of the sections following a forward displacement.
Figure 8:
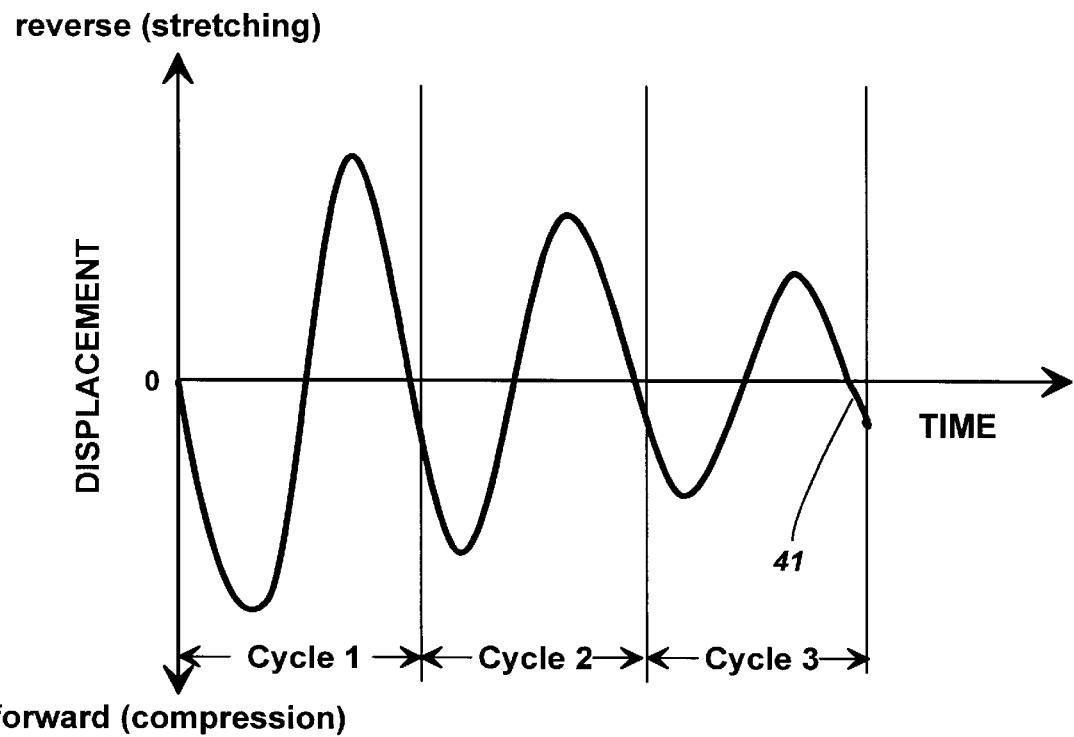
FIG. 8 is a graphical representation of a preferred displacement oscillation of this invention.

After heating, the sections are immediately brought together by displacing one or both of the holders toward each other along common axis 12. The arc tube sections 1 initially contact each other along their joining surfaces 7 forming interface region 27 as shown in FIG. 5. Compression is then applied by continuing to displace the sections in a forward direction toward each other and past the initial point of contact. As shown in FIG. 6, the compression causes the softened material in interface region to bulge outward forming visible seam 11. As the sections are brought together and compressed, the melted surfaces weld together to form a unitary arc tube body. At a predetermined point, the forward displacement of the arc tube sections is reversed and the sections are pulled away from each other causing a stretching of the material in the interface region. As shown in FIG. 7, the stretching causes the still pliable material in the interface region to thin thereby reducing the prominence of the seam. During stretching, the reverse displacement is preferably continued back through and beyond the initial point of contact between the sections. The cycle of compression and stretching may be repeated several times while the material is still in a plastic state. This displacement oscillation further reduces the prominence of the visible seam in the interface region. Preferably, the amplitude of the displacement oscillation diminishes with each successive cycle as shown in FIG. 8. Here the origin represents the initial point of contact between the joining surfaces. The slope of the curve indicates the direction of the displacement; a negative slope indicates a forward displacement of the sections toward each other; a positive slope indicates a reverse displacement of the sections away from each other. Each cycle ends with a second forward displacement of sections ending at a point past the initial point of contact (displacement=0) resulting in a net gathering of ceramic material in the interface region. Typically the length of each cycle in the displacement oscillation is about 0.05 seconds and the cycle is repeated two or more times. An exemplary value for the amplitude of the displacement oscillation is 0.004 in. ending with a net 0.002 in. forward displacement at the end of the cycle. After the displacement oscillation the parts are cooled for several seconds. The resulting unitary arc tube body is then subjected to a series of thermal processes to remove the binder and sinter the parts to theoretical density.

While there has been shown and described what are at the present considered the preferred embodiments of the invention, it will be obvious to those skilled in the art that various changes and modifications may be made therein without departing from the scope of the invention as defined by the appended claims.

We claim:

1. A method of assembling a ceramic body, the ceramic body containing a binder material and comprising at least a first section having a first joining surface and a second section having a second joining surface, the method comprising the steps of:
   (a) simultaneously heating the first and second joining surfaces to cause localized melting of the binder material;
   (b) initially contacting the first joining surface with the second joining surface to form an interface region; and
   (c) alternatively applying compression and stretching to the interface region to join the first section to the second section.

2. The method of claim 1 wherein the application of the compression and stretching results in a net gathering of ceramic material in the interface region.

3. The method of claim 1 wherein the heating is achieved with forced hot air.

4. The method of claim 1 wherein the heating is achieved by an infra-red laser, an incandescent lamp, or an incandescent resistive element.

5. The method of claim 1 wherein the compression and stretching are applied in repetitive cycles through an oscillating displacement of the sections.

6. The method of claim 5 wherein the amplitude of the displacement oscillation diminishes with each successive cycle.

7. The method of claim 1 wherein the sections are rotated during heating.

8. The method of claim 1 wherein at least one of the joining surfaces has a curved or beveled cross-sectional profile.

9. The method of claim 1 wherein at least one of the joining surfaces has a contact ridge which is offset toward the center of the respective section.

10. A method of assembling a ceramic arc tube in a green state comprising the steps of:
    (a) securing a first axially symmetric arc tube section in a first holder, the first arc tube section having a first electrode-receiving member and a first cavity-forming member, the first cavity-forming member having a first annular joining surface;
    (b) securing a second axially symmetric arc tube section in a second holder, the second arc tube section having a second electrode-receiving member and a second cavity-forming member, the second cavity-forming member having a second annular joining surface, the first and second arc tube sections containing a binder material;
    (c) simultaneously heating the first and second annular joining surfaces to cause a localized melting of the binder material;
    (d) initially contacting the first annular joining surface with the second annular joining surface to form an interface region; and
    (e) joining the first section to the second section by initially displacing at least one of the sections in a forward direction and then displacing at least one of the sections in a reverse direction.

11. The method of claim 10 wherein the relative positions of the first and second arc tube sections are determined before the joining surfaces are heated.

12. The method of claim 10 wherein the arc tube sections are secured in the holders by retractable pins which engage the electrode-receiving members.

13. The method of claim 10 wherein the reverse displacement of the sections is followed by second forward displacement.

14. The method of claim 13 wherein the second forward displacement results in a net gathering of ceramic material in the interface region.

15. The method of claim 10 wherein the forward displacement and the reverse displacement are applied in repetitive cycles.

16. The method of claim 15 wherein the magnitude of the displacements decreases with each successive cycle.

17. The method of claim 10 wherein the sections are rotated during heating.

18. The method of claim 10 wherein at least one of the joining surfaces has a curved or beveled cross-sectional profile.

19. The method of claim 10 wherein at least one of the joining surfaces has a contact ridge which is offset toward the center of the respective section.

20. A method for assembling a ceramic arc tube in a green state comprising:
    (a) securing first and second sections of an arc tube in opposed holders, the first and second sections containing a binder material and having first and second joining surfaces, respectively;
    (b) simultaneously heating the first and second joining surfaces to cause localized melting of the binder material;
    (c) contacting the first joining surface with the second joining surface; and
    (e) applying an oscillating displacement to join the sections.

21. The method of claim 20 wherein the amplitude of the displacement oscillation decreases with each successive cycle.

* * * * *